United States Patent
Kuke et al.

(10) Patent No.: US 6,297,487 B1
(45) Date of Patent: Oct. 2, 2001

(54) DEVICE FOR GENERATING AN ELECTRICAL CONTROL SIGNAL ACCORDING TO THE POSITION OF A LIGHT BEAM

(75) Inventors: Albrecht Kuke, Auenwald; Eberhard Moess, Murrhardt; Bernhard Schwaderer, Weissach; Klaus Hirche, Waiblingen; Werner Scholz, Weissach; Martin Warth, Schwaikheim, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/425,332

(22) Filed: Oct. 22, 1999

(30) Foreign Application Priority Data

Dec. 16, 1998 (DE) ................................................ 198 57 974

(51) Int. Cl.[7] ...................................................... G01J 1/20
(52) U.S. Cl. .................................. 250/201.1; 250/559.29
(58) Field of Search .............................. 250/201.1, 201.3, 250/201.5, 559.36, 559.29, 559.3, 442.11, 306, 307; 356/375; 369/44.13, 44.23, 44.11

(56) References Cited

U.S. PATENT DOCUMENTS 5,546,374 * 8/1996 Kuroda et al. ........................ 369/126

* cited by examiner

Primary Examiner—Que T. Le
(74) Attorney, Agent, or Firm—Michael J. Striker (57) ABSTRACT

The device for generating an electrical control according to a position of a light beam in relation to a separating line includes two photodetectors (14,24), one (14) of which is arranged for detecting light falling on one side of the separating line and another (24) of which is arranged for detecting light falling on another side of the separating line. The separating line is an edge (30) extending between two (1,1,1) crystallographic planes of a crystalline substrate and the (1,1,1) crystallographic planes reflect respective parts of the light beam to the respective photodetectors.

6 Claims, 7 Drawing Sheets

DEVICE FOR GENERATING AN ELECTRICAL CONTROL SIGNAL ACCORDING TO THE POSITION OF A LIGHT BEAM

BACKGROUND OF THE INVENTION

1. Field of the Invention

The present invention relates to a device for generating an electrical control signal according to a position of a light beam in relation to a border line or separating line extending transverse to the propagation direction of the light beam and, more particularly, to a device for generating an electrical control signal dependent on the position of the light beam in relation to the separating line which has two photodetectors, one which one is arranged to detect light falling on one side of the separating line and the other is arranged to detect light falling on the other side of the separating line.

2. Prior Art

A device for position determination of a light beam is required in a receiving unit, when information is transmitted between a transmitting unit and the receiving unit using the light beam. When the transmitting unit and/or receiving unit is movable, the beam direction must be continuously monitored during the transmission. The alignment of the beam must be performed with very slight angular tolerances, especially during transmissions over very large distances, such as between satellites.

Usually telescopes with lenses or mirror objectives are used for bridging very large distances. In order to transmit or receive a collimated light beam, the transmitting or receiving module must be mounted at the focal point of an objective. The image point of the received light beam moves in the focal plane of the objective during angular adjustment of the receiving telescope. The lateral spacing of the image point from the optical axis of the telescope is given by the product of the focal distance of the objective and the angular displacement between the beam propagation direction and the telescope optical axis. From the position of the image point the alignment of the telescope is determined and a control signal is generated for correction of the beam direction at the receiving device and/or transmitting device.

According to the state of the art there are several possibilities to determine the position of the light spot. For example the light spot can be received by a four quadrant diode, which detects the beam position by comparing the signals from the four quadrants. The beam alignment for coherent superimposed reception is described in European Patent Application EP-A-0831604. Light from a local oscillator is superimposed on the received signal and the overlapping signals are divided by means of beam splitter and sent along two light paths with an equal optical path length. Both beam parts are directed by separate optics comprising mirrors and lens onto two detection devices each comprising respective separate detector halves.

In the case of an ideal beam alignment both beam parts fall on the respective separating lines between the respective detector halves. A position deviation signal for the respective beam parts from their ideal or set positions is thus obtained by comparing the signal strengths from the detector halves of the respective detectors. This signal can be used for control. The separating lines between the detector halves of the respective detectors are displaced about 90° relative to each other, so that a first control signal from one pair of the detector halves can be used for correcting the X-axis deviation, while the other or second control signal from the other pair of detector halves can be used for correcting the Y-axis deviation.

Because of the size of the optical beam guiding elements for both beam parts both detector arrangements with the separate detector halves must be spaced several millimeters from each other. In order to obtain the required high accuracy for the alignment detection, the positions of both separating lines between the detector halves of the both detector arrangements relative to each other and to the optical beam guiding elements for the beam parts must have a positional accuracy of about 1 micrometer. This accuracy must be achieved at a spacing or distance of several millimeters to a few centimeters because of the size of the optical beam guiding elements.

In the known method of satisfying these requirements both detector arrangements are mounted on a common substrate. Since the detectors also operate to receive the transmitted data signals as well as produce the control signal, only small surface area photodiodes can be used because of the high bit rate of the data signal in the vicinity of up to 10 Gbit/s. Because of that aspect of the detectors the requirements for the positioning accuracy of the detector arrangements are further sharpened or increased.

SUMMARY OF THE INVENTION

It is an object of the present invention to provide an improved device for generating an electrical control signal according to a position of a light beam in relation to a border line or separating line extending transverse to the propagation direction of the light beam.

These objects, and others which will be made more apparent hereinafter, are attained in a device for generating an electrical control signal depending on or according to a position of the light beam in relation to the separating line, the device having two photodetectors, one of which being arranged to detect light falling on one side of the separating line and the other being arranged to detect light falling on the other side of the separating line.

According to the invention the separating line is an edge extending between two (1,1,1) crystallographic planes of a crystalline substrate and the (1,1,1) crystallographic planes reflect respective parts of the light beam to the respective photodetectors.

The device according to the invention has the advantage that the above-described specifications for positioning accuracy can be satisfied in a simple and reliable manner. Similarly the received light beam can be divided into two light beam parts as in the prior art method to obtain respective position controlling signals for control in two axes perpendicular to each other. Then the light sensitive surface of the detector is not divided into two separate halves, but each light beam part for producing the positioning signals is divided into two beam parts at an edge extending between two highly accurately aligned crystal planes, before it falls on a detector.

Advantageous further features are described in the detailed description and in the dependent claims appended hereinbelow.

In contrast to the device according to the prior art the device according to the invention has the advantage that the position adjustment tolerance of the beam dividing edges to each other and to the adjusting depressions for the beam forming module can be maintained with a very high accuracy, since the beam dividing edges in the adjusting depressions can be made in a common masking process.

BRIEF DESCRIPTION OF THE DRAWING

The objects, features and advantages of the invention will now be illustrated in more detail with the aid of the following description of the preferred embodiments, with reference to the accompanying figures in which.

Parts which are substantially the same in different figures are given the same reference number.

DESCRIPTION OF THE PREFERRED EMBODIMENTS

Figure 1:
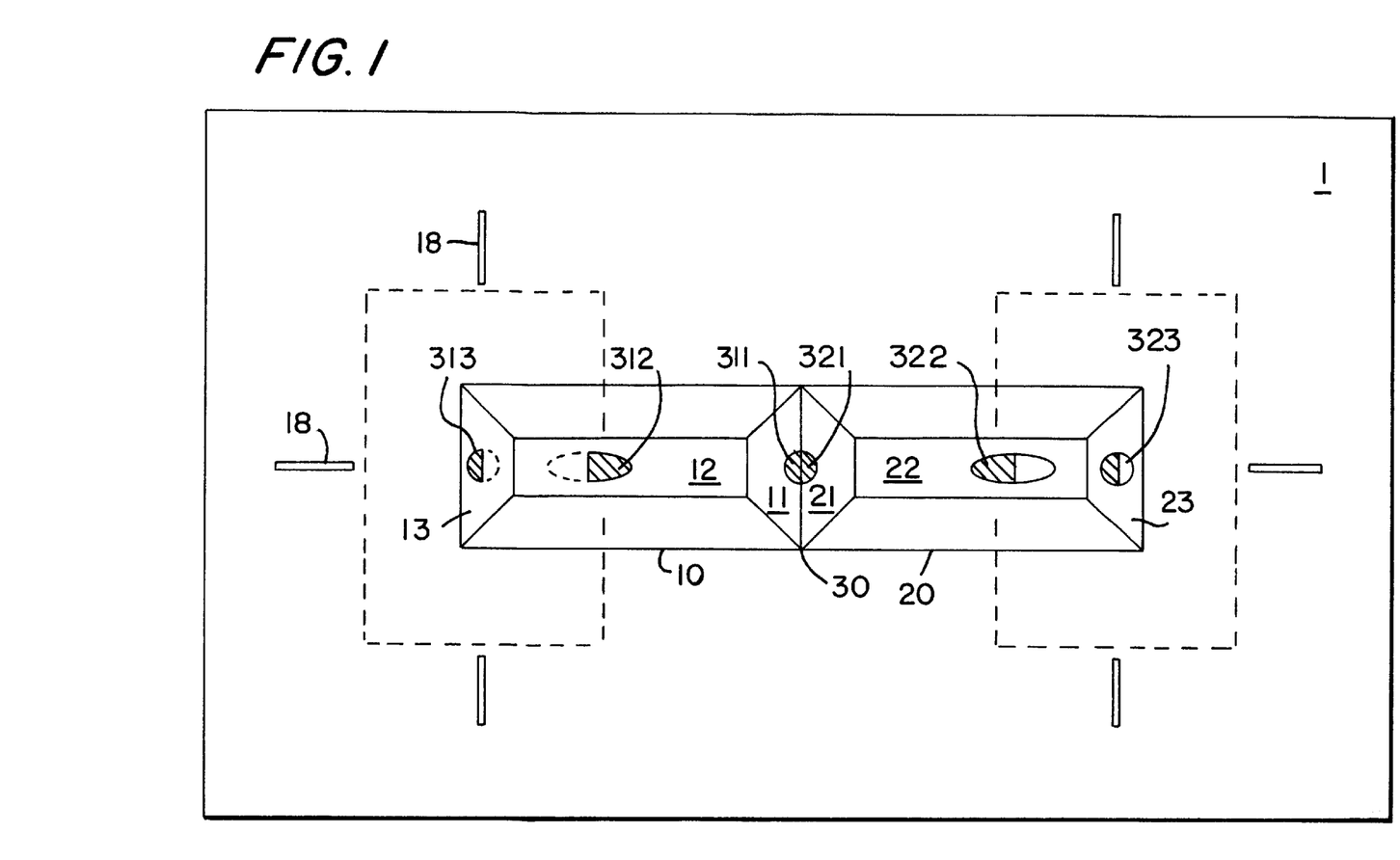
FIG. 1 is a front view of a device according to the invention.
Figure 2:
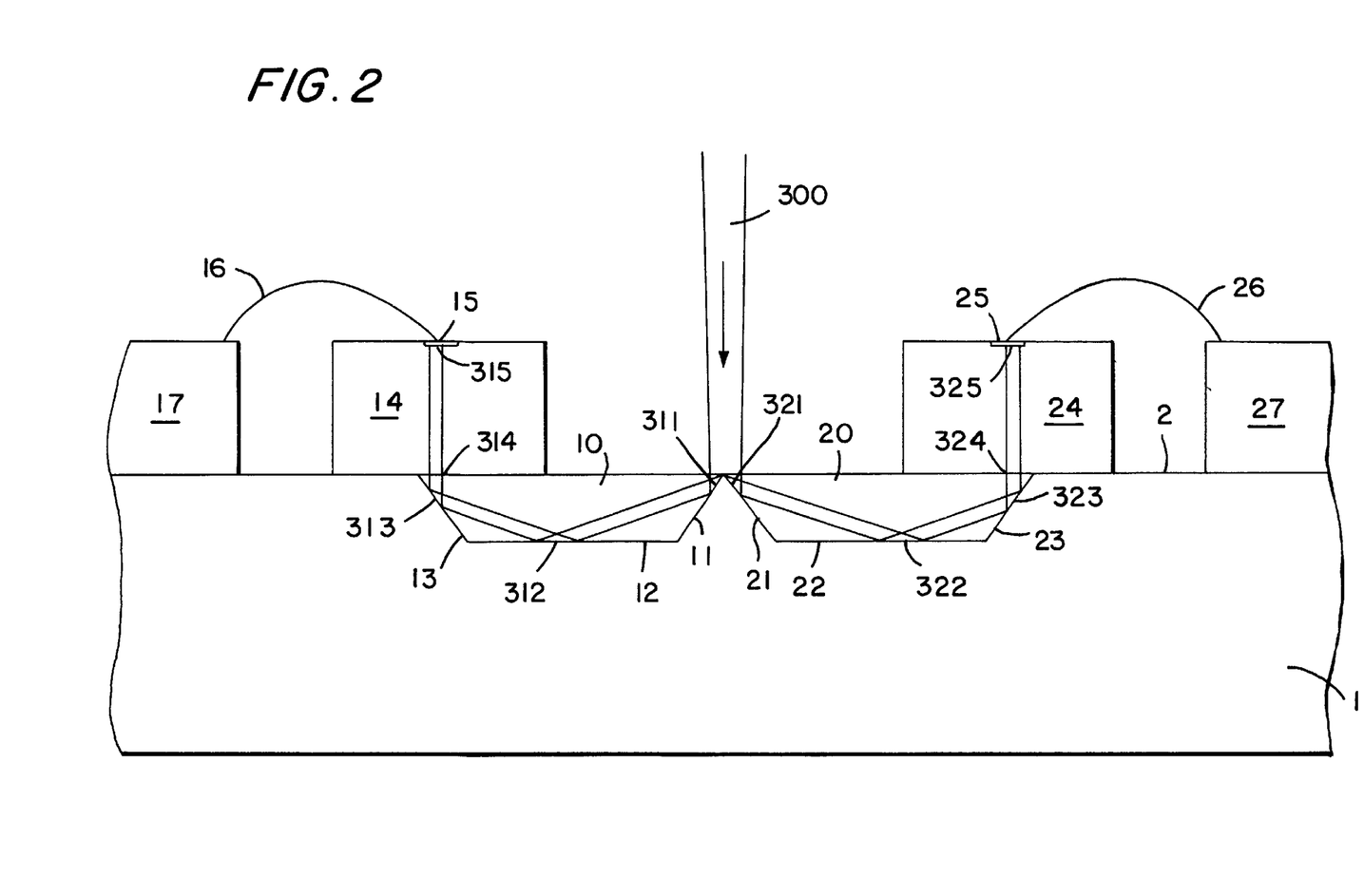
FIG. 2 is a cross-sectional view through the device shown in FIG. 1.

One embodiment of the device according to the invention for position detection of one of two light beams is shown in FIG. 1 in a plan view and in FIG. 2 in a cross-sectional view.

The base is a crystal of a regular system, especially a crystalline silicon substrate 1. Two trough-like depressions 10 and 20 are provided by anisotropic etching in a wafer upper surface 2 of the silicon substrate 1, whose crystallographic orientation corresponds to a (1,0,0) Miller index. The depressions 10 and 20 have (1,1,1)-oriented side surfaces that are inclined at bevel angle of 54.7° to the upper surface 2 according to the crystal geometry. After a predetermined time interval the anisotropic etching was halted, so that the depressions obtained each have a flat bottom surface 12, 22 at a predetermined depth. The side surfaces and the bottom surfaces of the depression are coated with a reflecting layer. Also the entire surface of the micromechanically structured substrate can be reflective for simplicity. For example, a thin gold layer can be used as the mirror or reflective layer.

A light beam 300 whose angular position is to be determined is aligned and formed by receiving optics of a receiver (compare the beam-forming module 50 in FIG. 5), so that a convergent light beam is produced which falls between the depressions 10 and 20 with its beam center on the edge 30 when the angular adjustment is optimum and the edge 30 is within the Rayleigh length of the light beam. (The Rayleigh length $Z_r = \pi \cdot w_o^2 / \lambda$ characterizes the axial extent of the near field region in the Gaussian light beam, wherein $w_o$ is the beam radius and $\lambda$ is the wavelength). The beam radius $w_o$ is typically about 25 μm large. A Rayleigh length $Z_r$ of 1845 μm results at a wavelength of 1.064 μm.

The edge 30 is formed as sharp or sharply defined as possible in order to avoid back reflection and power losses. In practice the spacing or distance on the top surface 2 between the depressions 10 and 20 at the edge 30 may be less than 3 μm. The light beam 300 is divided by the edge 30 into two beam parts 311 to 315 and 321 to 325, which pass through the depressions 10 and 20 arranged next to each other. There they fall on the spots 311 and 321 on the neighboring side surfaces 11 and 21 at the edge 30 and are reflected to the spots 312 and 322 on the bottom surfaces 12 and 22. From there the beam parts are reflected inclined upward until failing on the spots 313 and 323 on the back-facing opposing surfaces 13 and 23. Here the beam parts are again deflected upward. Photodiodes 14 and 24 (the positions of the photodiodes are shown in FIG. 1 with a dashed line) are mounted flat or in a planar orientation on the upper surface 2 above the respective reflecting surfaces 13 and 23 and each operate as a photo-receiving device.

These photodiodes can, for example, as shown in FIG. 2, be backside irradiated photodiodes, which in this case have their light sensitive surfaces 15 and 25 on their upper side. The light beam parts with their semicircular cross-sections 315 and 325 fall on the respective light sensitive surfaces of these photodiodes 14 and 24.

The light sensitive surfaces 15 and 25 are contacted from above by the respective bonding wires 16 and 26. The bonding wires, in turn, can be conducted either to respective tie lugs or to HF strip lines 17 and 27. The respective other terminals of the photodiodes can be contacted either by bonding wires to the top or upper side or by a conductive surface to the bottom surface of the photodiode chip (not shown in FIG. 2).

Similarly a front side irradiated photodiode can be used. It is mounted on the wafer upper side 2 with its light sensitive side pointing downward. The alignment can be simplified by a micromechanically structured justifying mark 18. Here flip-chip technology can be used for mechanical and electrical contacting.

Figure 7:
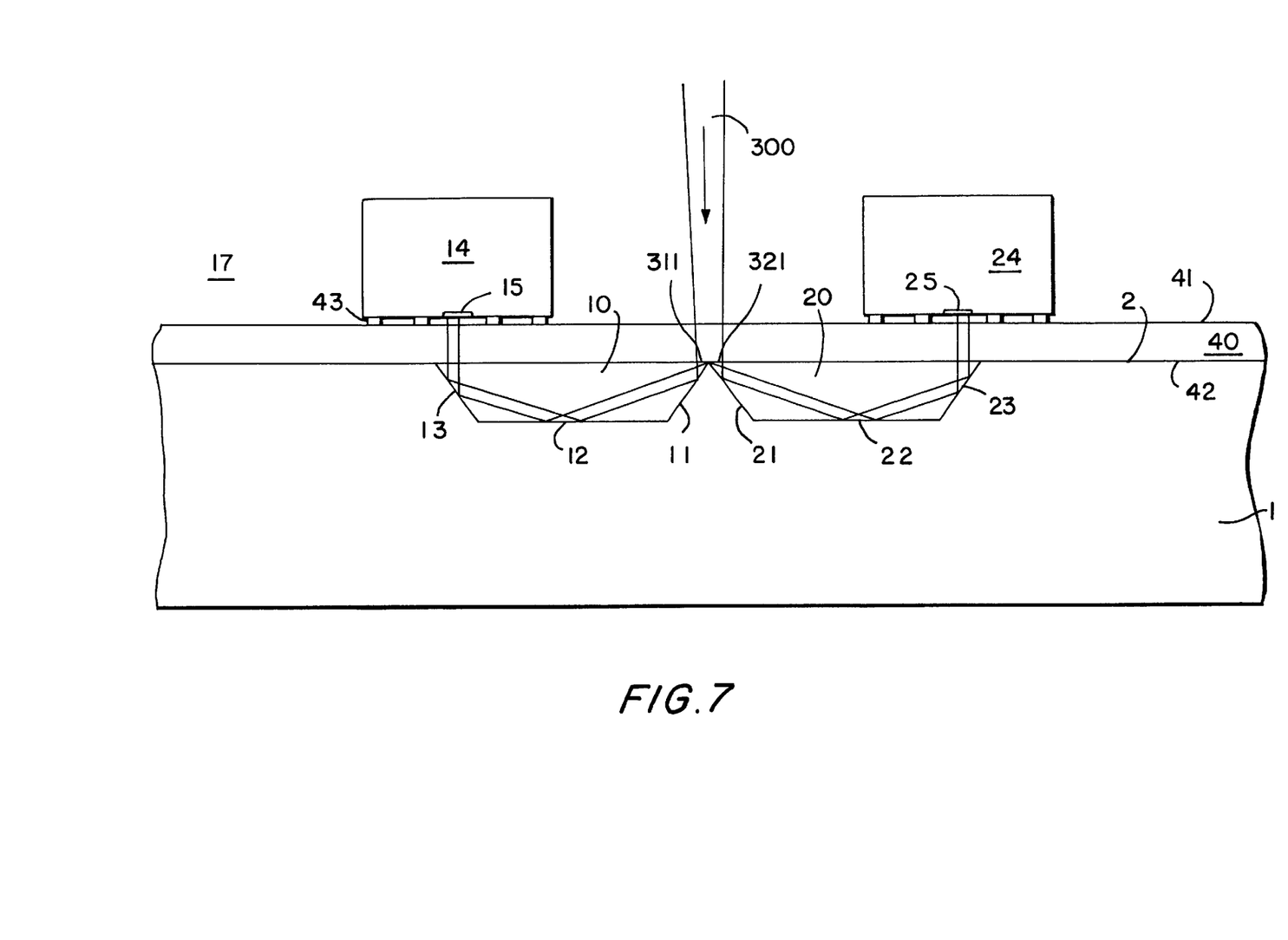
FIG. 7 is a cross-sectional view through another embodiment of the device according to the invention similar to that shown in FIG. 2.

In another embodiment for mounting and contacting of the photodiode it can be mounted on and contacts an additional transparent substrate 40 (FIG. 7), which is mounted above the silicon substrate 1. High frequency strip lines and contacting surfaces for bumps 43 on its upper surface 41 and a ground coating on its lower surface 42 can be provided according to known methods.

Figure 3:
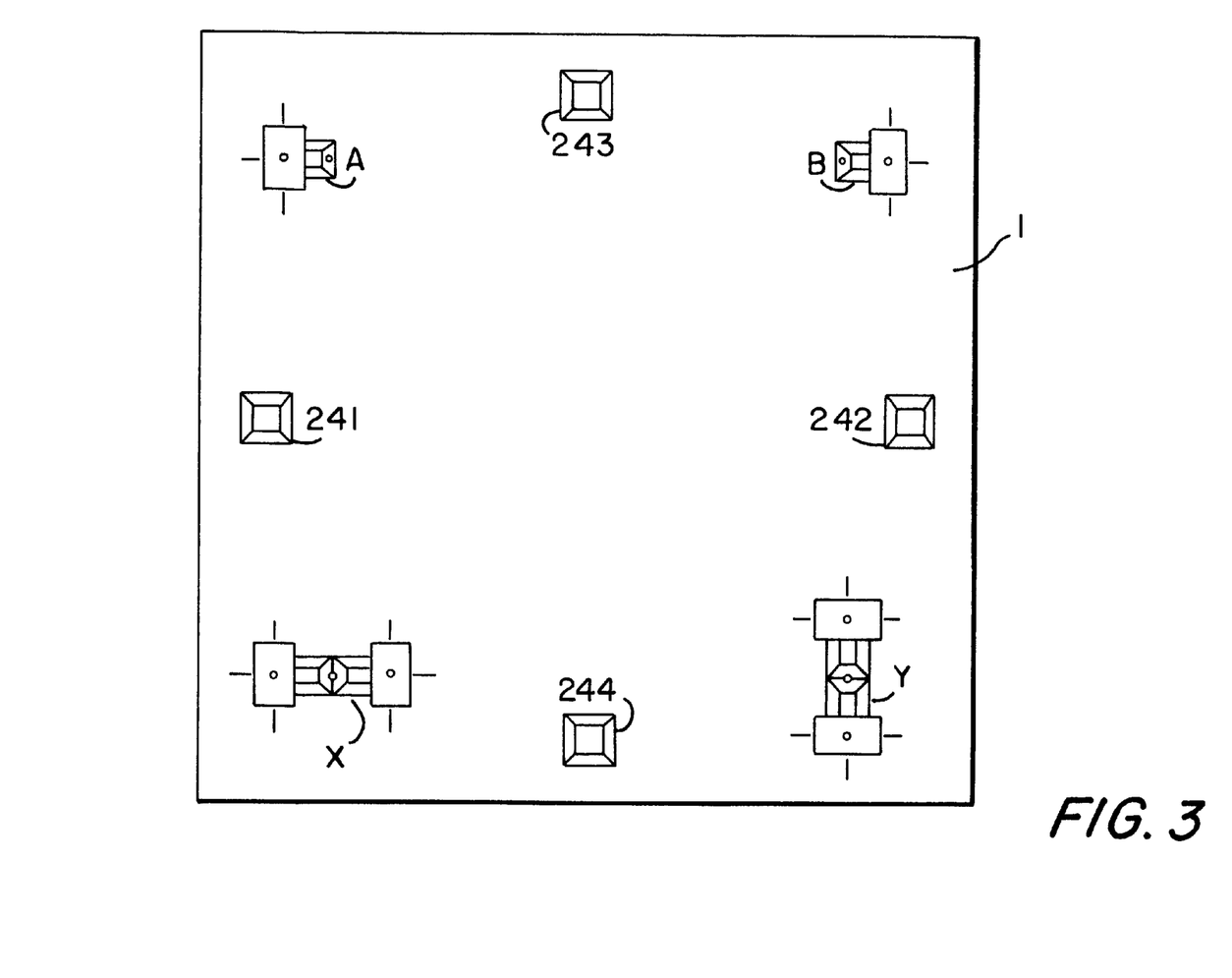
FIG. 3 is a plan view of two devices according to the invention mounted on a common diode carrier substrate.

In FIG. 3 two devices according to the invention are shown mounted on a common diode carrying substrate. Also two receiving devices according to FIGS. 1 and 2 are shown in the respective positions X and Y. The edges between the respective trough-like depressions are oriented perpendicularly to each other in order to be able to perform an angular correction in the X-direction and the Y-direction.

Figure 6:
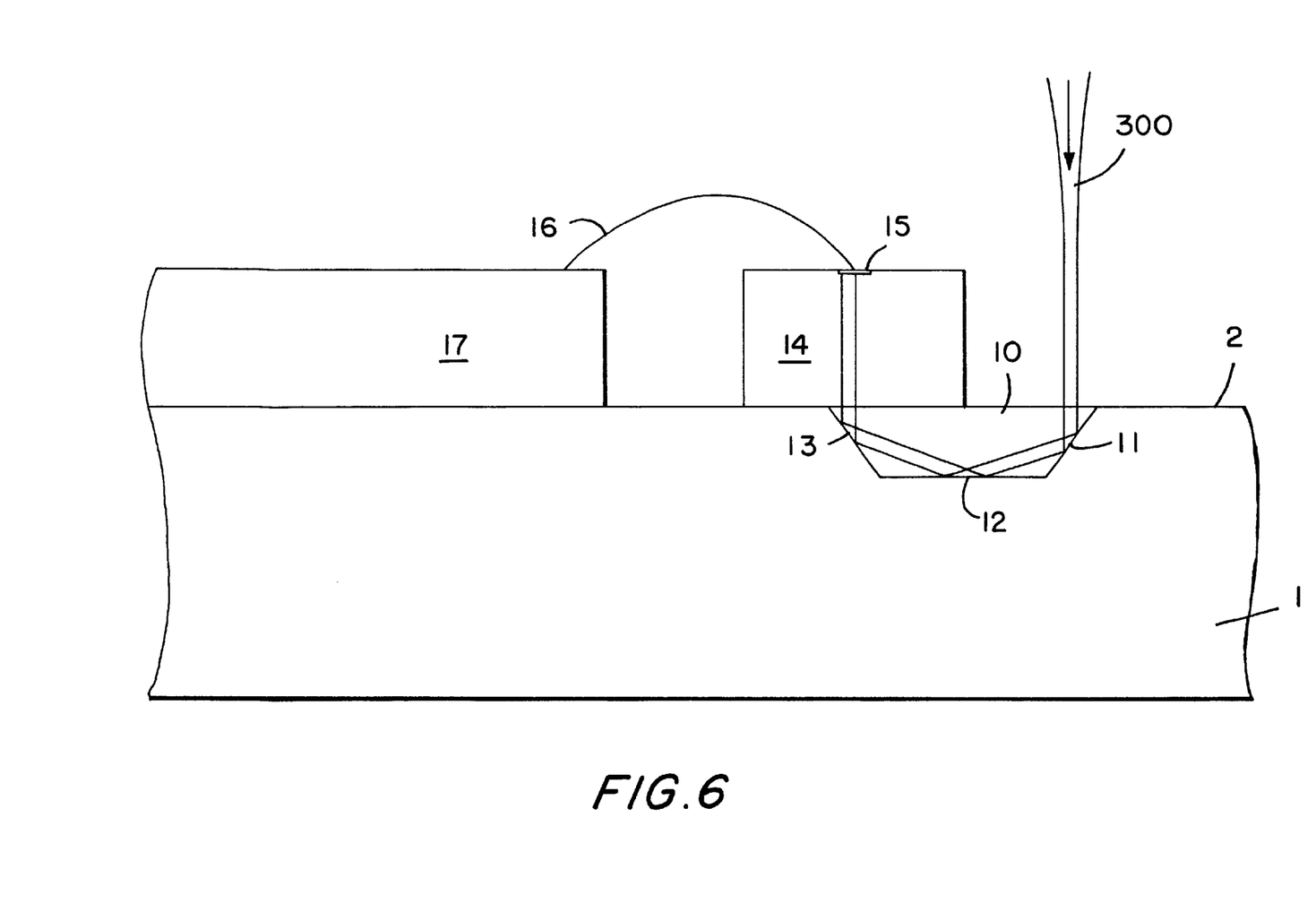
FIG. 6 is a detailed diagrammatic cross-sectional view of a part B of the device shown in FIG. 3.

Also two additional beam parts can be divided from the entire received light beam and directed to respective additional receiving positions A and B. These additional receiving devices are required for signal detection, for example in coherent phase-modulated superimposed reception. The respective beam parts are not divided for alignment detection at the additional receiving positions A and B. Also a trough-like depression can be used for reception without beam division. As shown in FIG. 6, the light beam is aligned on the center of a first opposing surface 11 of the etched trough-like depression 10. After reflection at this facing surface, the trough bottom surface 12 and a second opposing surface 13 the light beam is guided from below to a photodiode 14 mounted above it.

The entire substrate 1 with the receiving positions X, Y, A and B (FIG. 3) must be mounted and aligned relative to the optical beam-forming module, in which the received light beam is divided and focussed, with a very high accuracy, so that the four beam parts fall exactly on the provided reception positions and are held there. One embodiment of the present invention provides a solution for this problem. Here pyramid-shaped or truncated-pyramid shaped recesses 241, 242, 243 and 244 are anisotropically etched at at least two positions for that purpose. In FIG. 3 four of these recesses 241, 242, 243 and 244. Since these justifying or adjusting recesses are provided by the same anisotropic etching process and with the same mask as the trough-like depressions, the position tolerances for the trough-like depressions and recesses and the spacing of the through-shaped depressions and recesses relative to each other are in the range of less than one μm.

Figure 4:
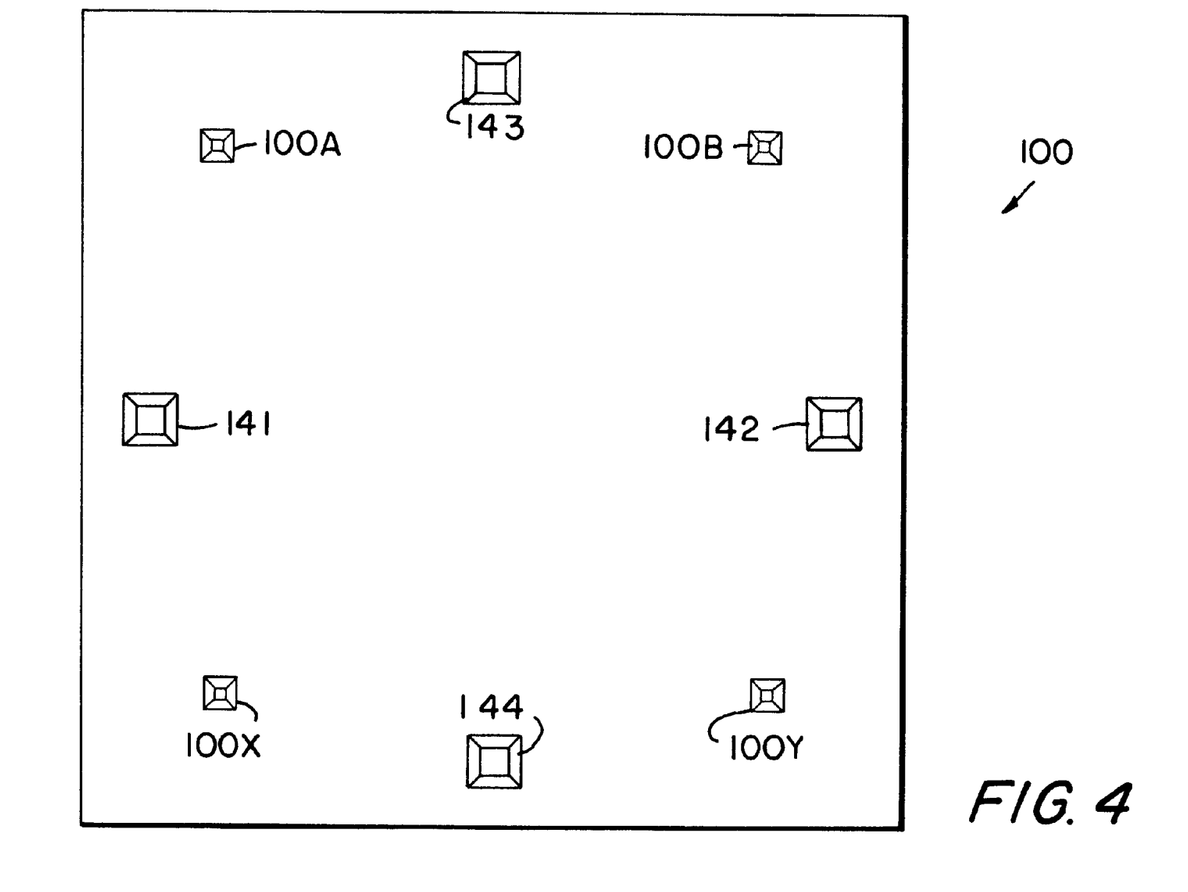
FIG. 4 is a plan view of a justifying mask made from silicon.
Figure 5:
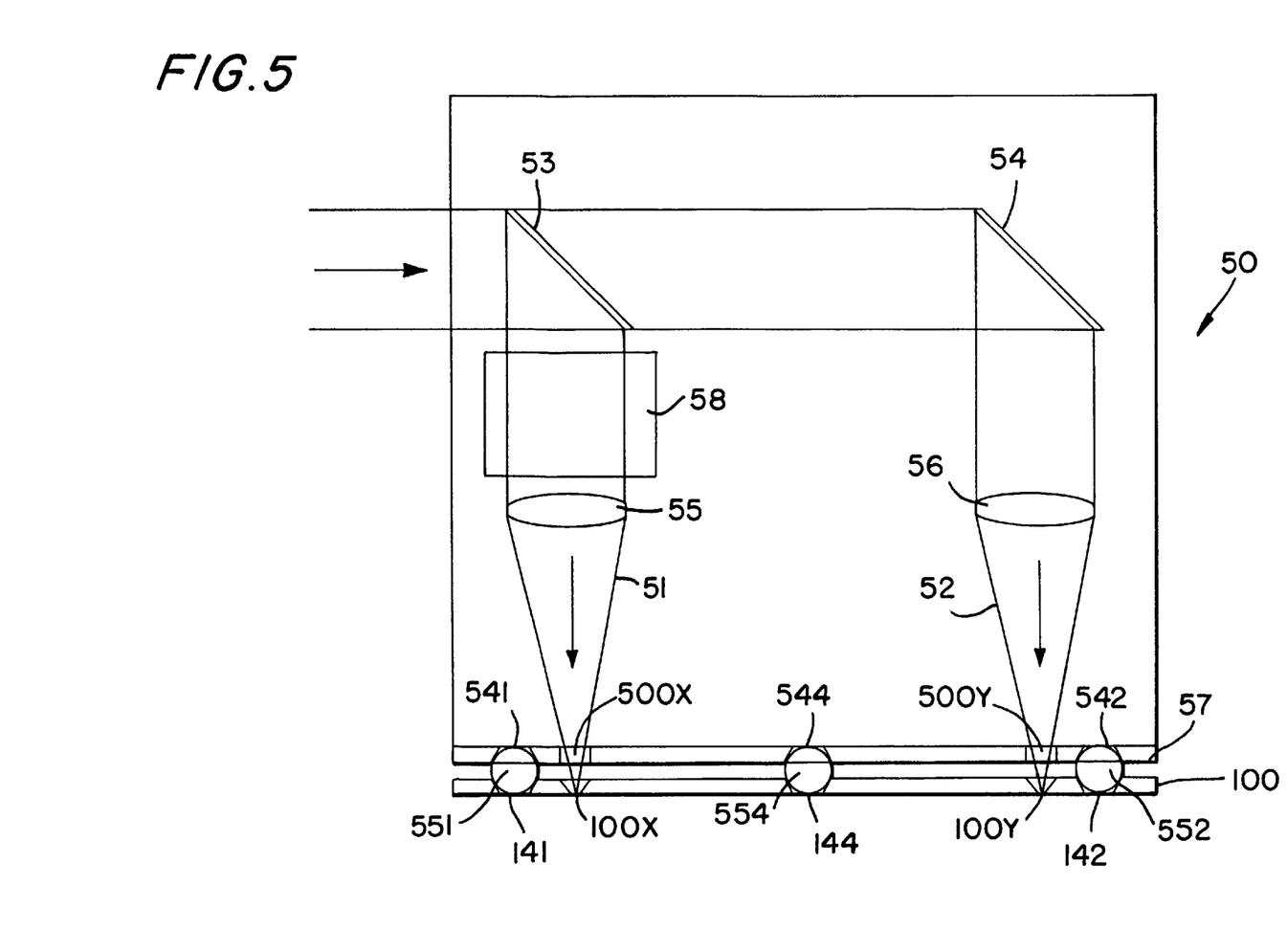
FIG. 5 is a plan view of a beam-forming module with justifying mask.

Similarly an adjusting or justifying mask 100 can be made from silicon for adjusting the beam parts in a beam-forming module 50 (FIG. 5). This adjusting or justifying mask 100 has justifying depressions 141 to 144 at the same positions as in the diode-carrying substrate 1 and has throughgoing holes 100X, 100Y, 100A and 100B etched at the receiving positions X, Y, A and B of the individual beam parts. The individual light beam parts 51, 52 (FIG. 5) can be adjusted with the help of the adjusting mask by means of the mirrors 53, 54 and the lenses 55,56, since the beam-forming module 50 with complementary structures 541 to 544 is arranged on its lower side 57 and adjusting balls 551 to 554 are arranged in the justifying depressions of the adjusting mask.

The adjustment of the light path lengths of the respective light beam parts occurs by means of one or more delaying modules 58. The light-forming module 50 can then be mounted and held fixed without additional adjustment on the diode carrying substrate 1 in the corresponding justifying depressions.

In the prior art device described in EP 0 831 604 A1 the receiving diodes themselves are divided into two halves. The position of the separating line between the diode halves is itself determined and fixed by the diode position. The precision of the angular correction is determined directly then by the position of these separating lines of both alignment detecting devices to each other and to the beam positions, which are determined by the position of the beam-forming module. In the above-described embodiment however the receiving diodes are positioned with the highest accuracy. This is only possible with very great adjusting effort and thus with great expense. In contrast in the embodiment according to the invention however the high accuracy requirements are fulfilled in an economical manner by micromechanical structuring. The positioning of the photodiodes on the substrate upper surface is not critical and must only be accurate enough so that a good coupling efficiency is achieved according to the ratio of the beam diameter and the diameter of the active photodiode surfaces. Typically tolerances of less than 10 μm, which can be achieved with normal etching methods, are sufficient. The positioning of the photodiodes can be simplified by a micromechanically produced justifying mark 18 on the wafer upper surface or by known flip-chip technology.

Eventually troublesome back reflections from the edge 30 or from the photodiode upper and lower surfaces can be avoided in a known manner by inclined orientation of the light beam. The light path lengths and beam guiding changed because of that inclined orientation may be compensated by suitable modification of the geometry of the trough-like depression and the position of the justifying mark 18. The inclined orientation of the individual light beam parts may be obtained in a simple manner by slight lateral displacement of the justifying structures 541 to 544 relative to the mirrors 53,54 and lenses 55,56, without tilting the beam-forming module 50 relative to the diode carrying substrate 1. No additional optical path differences are produced in the beam-forming module by the beam inclination produced in this manner.

The disclosure in German Patent Application 198 57 974.8 of Dec. 16, 1998 is incorporated here by reference.

This German Patent Application describes the invention described hereinabove and claimed in the claims appended hereinbelow and provides the basis for a claim of priority for the instant invention under 35 U.S.C. 119.

While the invention has been illustrated and described as embodied in a device for generating an electrical control signal according to a position of a light beam in relation to a border line or separating line extending transverse to the propagation direction of the light beam, it is not intended to be limited to the details shown, since various modifications and changes may be made without departing in any way from the spirit of the present invention. without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A device for generating an electrical control signal according to a position of a light beam in relation to a separating line, said device comprising two photodetectors (14,24), one (14) of said photodetectors being arranged for detecting light falling on one side of the separating line and another (24) of said photodetectors being arranged for detecting light falling on another side of the separating line; wherein said separating line is an edge (30) extending between two (1,1,1) crystallographic planes of a crystalline substrate (1) and said (1,1,1) crystallographic planes reflect respective parts of said light beam to the respective photodetectors (14,24).

2. The device as defined in claim 1, wherein said crystalline substrate (1) has a (1,0,0) crystallographic plane forming an upper surface (2) thereof, respective depressions (10,20) are provided in said upper surface of said crystalline substrate by etching and said (1,1,1) crystallographic planes bound said depressions.

3. The device as defined in claim 2, wherein said photodetectors (14,24) are supported on said upper surface (2) of the crystalline substrate (1) and said depressions (10,20) have additional planes arranged to reflect said respective parts of said light beam.

4. The device as defined in claim 1, further comprising another edge for light beam division extending between two other crystallographic planes of said crystalline substrate (1) spaced from said edge between said two (1,1,1) crystallographic planes.

5. The device as defined in claim 2, further comprising means for self-adjusting a beam-forming module (2) and wherein said means for self-adjusting includes pyramid or truncated pyramid-shaped recesses (241 to 244) provided in an upper surface (2) of said crystalline substrate (1) by anisotropic etching.

6. The device as defined in claim 2, wherein said (1,1,1) crystallographic plane in one (10) of said depressions is oriented so that said part of said light beam falling in said one (10) of said depressions is completely reflected by said (1,1,1) crystallographic plane to a bottom surface (12) of said one (10) of said depressions and from there reflected to one (14) of said photodetectors arranged on said upper surface (2).

* * * * *